United States Patent Office 3,345,289
Patented Oct. 3, 1967

3,345,289
FIRE RETARDANT COMPOSITION OF DIAMMONIUM PHOSPHATE CONTAINING METHYLVINYL ETHER - MALEIC ANHYDRIDE COPOLYMER AS THICKENER
Milton Freifeld, Easton, Pa., and Bradford Churchill, Alden, N.Y., assignors to General Aniline & Film Corporation, New York, N.Y., a corporation of Delaware
No Drawing. Filed Nov. 1, 1965, Ser. No. 505,962
5 Claims. (Cl. 252—8.1)

ABSTRACT OF THE DISCLOSURE

An aqueous fire retardant composition containing diammonium phosphate and a vinyl compound-maleic compound copolymer, such as the copolymer of methylvinyl ether and maleic anhydride, as a thickener.

---

The present invention relates to improvements in fire retardant compositions and processes for making them. It has particular application to an aqueous fire retardant comprising an aqueous solution of a fire inhibiting salt to which is added a polymeric thickener.

Various suggestions have been made in the past for using certain additives in water to enhance its fire fighting properties. Thus it has been suggested that certain polymeric or gel forming materials, both organic and inorganic, might be used to thicken the water used to fight fires and thus make it to remain longer in place. Alternatively, various suggestions have been made in the prior art for the addition of certain fire inhibiting salts, including ammonium salts, to water. There is currently considerable interest in the use of chemical fire fighters along with water to more effectively extinguish and prevent fires under various situations.

It is, therefore, one object of the present invention to provide a thickening composition which can be added to water, or which can be diluted with water, to make a very effective fire retardant material, particularly in connection with fire retarding ammonium-phosphorus salts. In particular, this invention proposes that an aqueous solution of diammonium phosphate be thickened to an appreciable degree with an organic copolymeric material which is particularly suitable for this purpose. Either the copolymer itself, derived from certain vinyl compounds in combination with certain alpha-beta unsaturated carboxylic acids or derivatives, or some of its simple derivatives, particularly the amide, or the ester, or half amide or half ester derivatives thereof are highly satisfactory for the purpose. The compositions obtained when aqueous ammonium salts are treated with the polymeric materials are of the non-foaming type. However, they are very effective for use as direct fire fighting materials as well as being useful for fire retardants and suppressants.

Compounds comprising these copolymers and their derivatives, whic hare used to thicken aqueous diammonium phosphate, are particularly valuable for fire retarding properties. Some thickeners of a broadly similar type have been used on occasion in aqueous compositions in the past. For example, materials such as gum tragacanth, sodium alginates, and soluble cellulosic materials such as carboxymethylcellulose and the corresponding ethyl cellulose compound, have been so used. Also, relatively thick slurries containing bentonite and the like have been proposed and sometimes actually used for such purposes. However, most of these prior art materials are not at all suitable for use in aqueous concentrations of diammonium phosphate. The reason for this is that the diammonium phosphate salt tends to destroy the thickening properties of these materials and hence renders them largely useless so far as their effectiveness for fire fighting or fire retarding purposes is concerned.

In the prior art it has been suggested also that an aqueous system containing diammonium phosphate would be a more efficient fire fighter than materials commonly used for the same purpose. In order to be effective, for the purposes of this invention, however, these materials when in water solution should have viscosities between 100 and 400 centipoises. This viscosity range relates particularly to fire retardant agents which are used to treat fuel that is not burning, such as wood, coal, etc. Materials of this type are used so that the combustion process is modified and greatly held back if not completely stopped when the fire reaches the treated fuel. On the other hand, for use as suppressants when flames have already started, viscosities of the fire fighting liquids as high as 3,500 to 5,000 centipoises are desirable. Such materials normally will be used to extinguish flaming or glowing combustion by direct application to the burning substance.

Viscosities of the general range mentioned above are highly useful and they impart several needful properties or advantages to fire retardants of water base type over non-thickened systems.

In the first place, the thickened systems have an ability to knock down a fire in less time. They form sheet-like blankets which keep air away, more effectively, from the burning fuel. Secondly, thickened systems prevent reignition of a fire after it has been extinguished, even though considerable heat is present. This is due at least in part to blanketing action. Heat may still be present at a temperature sufficient to kindle a new flame except for the presence of the retardant. Thirdly, thickened systems are more able to cling to and cover vegetation. Otherwise, vegetation frequently burns and assists fires, once dehydration of the vegetation begins. Fourthly, thickened systems evaporate more slowly and therefore have longer lasting effects than non-thickened aqueous systems. Fifthly, thickened systems are found to produce a more efficient and more continuous ground pattern when they are dropped from above, for example, from flying vehicles, long range hoses, etc. when used to extinguish incipient forest fires and the like.

Additionally, thickened aqueous ammonium phosphate systems minimize the clean up duties after a fire. For example, there is often no need to clean up after a forest fire because, when rain falls, the chemical ingredients will simply be washed into the ground and disappear. Moreover, such thickened systems act as a fertilizer and they dissolve and soak into the soil and they will help subsequent re-establishment of vegetation, rather than destroying vegetation, which would result in increased water runoff which causes soil erosion.

Polymers which are particularly suitable for the purposes of this invention are known per se in the prior art, although, as far as applicants are aware, they have not been suggested for use in the manner here proposed. They comprise several polyvinyl compounds, particularly certain ethers and nitrogen derivatives copolymerized with either maleic anhydride or maleic compound derivatives. Vinyl compound-maleic anhydride copolymers readily react with water, alcohols, alkali hydroxides, ammonia and amines to yield the free acid up to 50%, partial esters, amides, and salts thereof as disclosed in U.S. 2,047,398 (Re. 23,541), referred to herein as vinyl compound-maleic compound copolymer. Such copolymers and their simple derivatives, particularly the half amides, the half ammonium salts, and the half esters of such materials, are found to be very effective for the purposes of this invention. Copolymer partial esters of the so called "Igepal" surfactants, some of which are described in U.S. Patent 2,213,477, are found to be very effective thickeners for aqueous systems containing high concentrations of diammonium phosphate. These thickeners have a very definite advantage of stability over many materials previously suggested for use as thickeners. They will not settle out of solution, for example, as certain of the alginates frequently do. They are moreover very efficient thickeners in relatively very low concentrations. Other specific polymers that are highly satisfactory for thickening effects are described in general terms in U.S. Patent 2,047,398. These are copolymers, obtained by polymerization of vinyl compounds having a single $>C=CH_2$ group in admixture with a compound of the general formula:

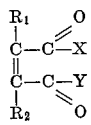

In the formula just given $R_1$ and $R_2$ stand for hydrogen, halogen, sulfonic acid radicals or alkyl, aryl or aralkyl radicals. X and Y stand for either —OH, O—alkyl, O—aryl or halogen, or X and Y together may stand for oxygen. Specifically, such compounds may be used as alpha, beta unsaturated dicarboxylic acid, such as maleic acid, fumaric acid, itaconic acid, citraconic acid, phenylmaleic acid, benzyl-maleic acid, dibenzyl-maleic acid, ethyl maleic acid, or the anhydrides of any of these acids which can be obtained. Maleic anhydride itself is very satisfactory. Derivatives of maleic acid or maleic anhydride, in particular, may be used, such as 5–50% esters and amides. Other compounds which are capable of being polymerized with those described above are those containing a single $>C=CH_2$ group, namely, ethylene, vinyl esters, vinyl ethers, vinyl halides, phenylvinyl, acrylic acids and its esters, cinnamic acid esters and the like. Vinyl pyrrolidone in particular may be used and is highly satisfactory as one of the materials to be copolymerized with the maleic acid or the maleic derivatives.

The invention will be more fully understood by reference to the following specific examples.

EXAMPLE I

*Aqueous diammonium phosphate thickened with a copolymer of polyvinyl methyl ether and maleic anhydride or its half amides*

A solution of 300 grams of diammonium phosphate in 1700 grams of water (15% by weight) was used as the diluent for each of the aqueous solutions tabulated below. The viscosity in centipoises was determined with a Brookfield Viscometer, using the No. 4 spindle at 60 r.p.m. Viscosity was measured in each case at room temperature.

TABLE I

|   |   | 1%, cps. | 2%, cps. | 3%, cps. | 4%, cps. |
|---|---|---|---|---|---|
| I | Polyvinyl methyl ether and maleic anhydride (PVM/MA). | 100 | 250 | 450 | 850 |
| II | Half Amide of PVM/MA of specific viscosity 0.5. | 90 | 200 | 580 | 900 |
| III | Half Amide of PVM/MA of specific viscosity of 4.0. | 800 | 2,650 | 8,650 | >10,000 |

EXAMPLE II

*Diammonium phosphate solution thickened with polyvinyl methyl ether/maleic anhydride derivatives*

The stock solution of diammonium phosphate, prepared as in Example I, was used as a diluent for the following materials, as listed in Table II. The partial esters of "Igepal" surfactants with the copolymer of methyl vinyl ether and maleic anhydride, were prepared as described in U.S. patent application Ser. No. 202,098 filed June 12, 1962, first in water and thereafter a quantity of solid diammonium phosphate, sufficient to make a 15% solution by weight, was added to the water containing the copolymer. Results are tabulated below:

TABLE II

|   | 0.5%, cps. | 1% | 2% | 3% |
|---|---|---|---|---|
| PVM/MA (I) | 40 | | | |
| Half Amide of PVM/MA of specific viscosity 4.0 (III) | 120 | | | |
| PVM/MA 5% partial (Igepal CO-630 ester) | 35.2 | 412.5 | 4,560 | >50,000 |

EXAMPLE III

*Diammonium phosphate solution, thickened with a 50:50 weight ratio of the polymeric additives of Examples I and II*

A stock solution was prepared containing 25 grams of "Igepal CO–630" in 450 grams of water. To this solution was added 25 grams of polyvinyl methyl ether/maleic anhydride copolymer, the mixture being rolled on a roller until solution was water white and clear. 10 grams of the resulting polymeric solution was then added to a pre-dissolved solution of 15 grams of diammonium phosphate in 75 grams of water. This solution, as first prepared, was viscous but it separated into two layers. Since this was not satisfactory, another solution was prepared by adding 10 grams of the esterified 50/50 Igepal CO–630-polyvinyl methyl ether/maleic anhydride stock to 35 grams of water. To this water was added a predissolved solution containing 15 grams of diammonium phosphate in 35 grams of water. This solution also separated into two layers. Hence, it also was discarded. Next, 10 grams of the 50:50 copolymer mixture just described was added to 75 grams of water and dissolved. After the solution of the copolymer was complete there was added to such solution 15 grams of diammonium phosphate as a solid salt. This salt was dissolved and the solution of the thickener remained stable. It did not separate as the previous specimens had done and it was highly viscous.

The Igepal CO–630 mentioned above is understood to be a nonylphenol compound to which is added 9.0 moles of ethylene oxide. This material readily forms esters with the polyvinyl methyl ether/maleic anhydride copolymers and related compositions.

All of the materials listed in Examples I, II, and III have been found to have excellent fire retarding and fire fighting properties. They appear to be superior to presently used materials such as bentonite slurries which are often prepared for the same purpose.

It will be apparent that various and obvious changes may be made in the ingredients and that minor properties of other materials may be added to the fire retardant mixtures so prepared without substantially changing their essential properties and without departing from the spirit and purpose of the present invention. It is intended by the claims which follow to cover such variations as would occur to those skilled in the art, as broadly as the prior art properly permits.

What is claimed is:

1. A fire retardant composition consisting essentially of an aqueous solution of diammonium phosphate containing a thickening agent selected from the class consisting of copolymers of methylvinyl ether and maleic anhydride and partial amides and partial esters thereof.

2. A composition according to claim 1 wherein the thickening agent is the copolymer of methylvinyl ether and maleic anhydride.

3. A composition according to claim 1 wherein the thickening agent is the half amide of the copolymer of methylvinyl ether and maleic anhydride.

4. A composition according to claim 1 wherein the thickening agent is a partial ester of the copolymer of methylvinyl ether and maleic anhydride.

5. A composition according to claim 1 wherein the thickening agent is the partial ester of the copolymer of methylvinyl ether and maleic anhydride and a nonyl phenolethylene oxide reaction product.

References Cited

UNITED STATES PATENTS

| | | | |
|---|---|---|---|
| 2,523,626 | 9/1950 | Jones et al. | 260—6 |
| 2,912,394 | 11/1959 | Stilbert et al. | 260—17.4 |
| 2,921,930 | 1/1960 | Suhrie | 260—29.6 |
| 2,998,400 | 8/1961 | French | 260—29.6 |
| 3,080,316 | 3/1963 | Peterlyl | 252—8.1 |
| 3,196,108 | 7/1965 | Nelson | 252—2 |

MURRAY TILLMAN, *Primary Examiner.*

W. J. BRIGGS, SR., *Assistant Examiner.*